Dec. 6, 1949     I. GHERTMAN     2,490,348
CONTROL DEVICE FOR ACCOUNTING MACHINES
Filed Feb. 11, 1947     6 Sheets-Sheet 1

INVENTOR,
Ioino Ghertman.
BY Edward R. Sounder
AGENT

Dec. 6, 1949     I. GHERTMAN     2,490,348
CONTROL DEVICE FOR ACCOUNTING MACHINES
Filed Feb. 11, 1947     6 Sheets-Sheet 3

INVENTOR,
Ioino Ghertman.
BY
Edward R. Lowndes
AGENT

Dec. 6, 1949　　　I. GHERTMAN　　　2,490,348
CONTROL DEVICE FOR ACCOUNTING MACHINES
Filed Feb. 11, 1947　　　6 Sheets-Sheet 4

INVENTOR,
Ioino Ghertman.
BY
Edward R. Lowndes
AGENT

Dec. 6, 1949　　　I. GHERTMAN　　　2,490,348
CONTROL DEVICE FOR ACCOUNTING MACHINES
Filed Feb. 11, 1947　　　6 Sheets-Sheet 5

INVENTOR,
Ioino Ghertman.
BY
Edward R. Lowndes
AGENT

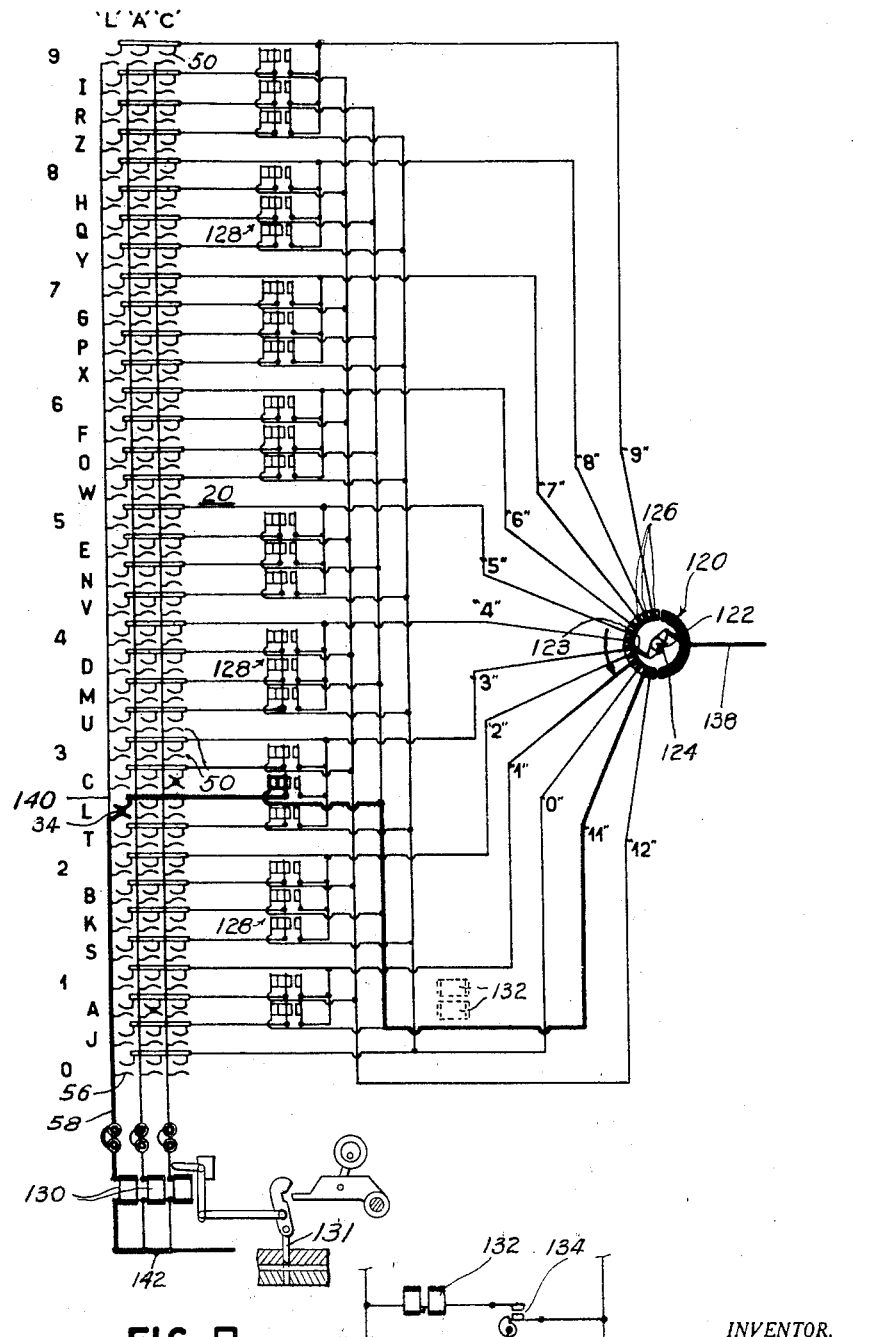

Patented Dec. 6, 1949

2,490,348

UNITED STATES PATENT OFFICE 2,490,348

CONTROL DEVICE FOR ACCOUNTING MACHINES

Ioino Ghertman, Saint-Mande, France, assignor to International Business Machines Corporation, New York, N. Y., a corporation of New York Application February 11, 1947, Serial No. 727,892
In France November 7, 1944

Section 1, Public Law 690, August 8, 1946
Patent expires November 7, 1964

4 Claims. (Cl. 164—115)

The present invention relates to record controlled accounting machines and, more particularly, to machines of the type having mechanisms associated therewith for automatically punching totals in a record card.

Specifically, the invention is concerned with a summary card control mechanism designed for use in an accounting system wherein a card controlled accounting machine is associated with a punching machine for punching data (which may be both alphabetical and numerical) in record cards under the control of the tabulating machine.

In this type of accounting, it is often necessary to register certain alphabetic and/or numerical data separately, as for example, name, address, date or serial number. Such data will remain for a certain length of time in the registering devices and are subsequently transferred at will either to the printing mechanism of the tabulating machine when it is desired to duplicate them on the record sheet, or to a perforating machine which punches the data on a card at the time of printing each total. In the latter case, the perforating machine is adapted to punch not only the various accumulated totals, but also the data perforated on the first card of the series.

Ordinarily, in operations of this type, the various functions that must be performed require the use of numerous registering devices and accumulators to effect the additions, subtractions, transfers and the like. In particular, where data of an alphabetic nature is concerned requiring the use of the usual "1" to "9" digit perforations, in combination with special zone perforations "0," "11" and "12," a large number of registering devices in excess of 50% of the available number inherent in the machine would have to be set aside to perform the necessary duplicating or calculating functions.

The present invention is designed to overcome the above mentioned limitations that are attendant upon this type of machine accounting and, toward this end, comprises a control device for the purpose stated which does not require the use of registering devices or of the costly relays required for their operation.

The present invention is also useful in connection with accounting machine operations wherein data is transferred from a record card or other data-bearing source to a printing machine and thereafter total-taking operations are resorted to. In such an event, particularly where the transfer involves the human element, the mere fact that a previously calculated total is arrived at is not a positive indication that the transferred printed data representing the individual items of the total are correctly printed on the record sheet. The control mechanism of the present invention is designed to insure exact coordination of printed data with the data entered into the total taking instrumentalities.

Briefly, the present invention contemplates the provision of an electromechanical readout device of novel construction which will translate data directly from the type bars of the printing mechanism after these type bars have been brought into printing position and complete suitable output circuits leading to the electromagnets of a perforating or other record making machine. Where alphabetic data is concerned, utilizing both the digit and special zone perforations, the apparatus has associated therewith an impulse emitter which operates through a series of three-blade contacts controlled by a multiple contact relay device in such a way that two distinct impulses are created during the same card cycle and which impulses correspond to the two perforations of the alphabetic code. These impulses are transmitted through a single output circuit for control of a single operating device which may be, for example, one of the punch operating magnets of the perforator.

Other objects of the invention will be pointed out in the following description and claims and illustrated in the accompanying drawings, which disclose, by way of example, the principle of the invention and the best mode, which has been contemplated, of applying that principle.

In the drawings:

Fig. 8 is a diagrammatic view showing a readout device designed for use in connection with both numerical and alphabetic characters and showing the electrical connections therefor.

Figure 1:
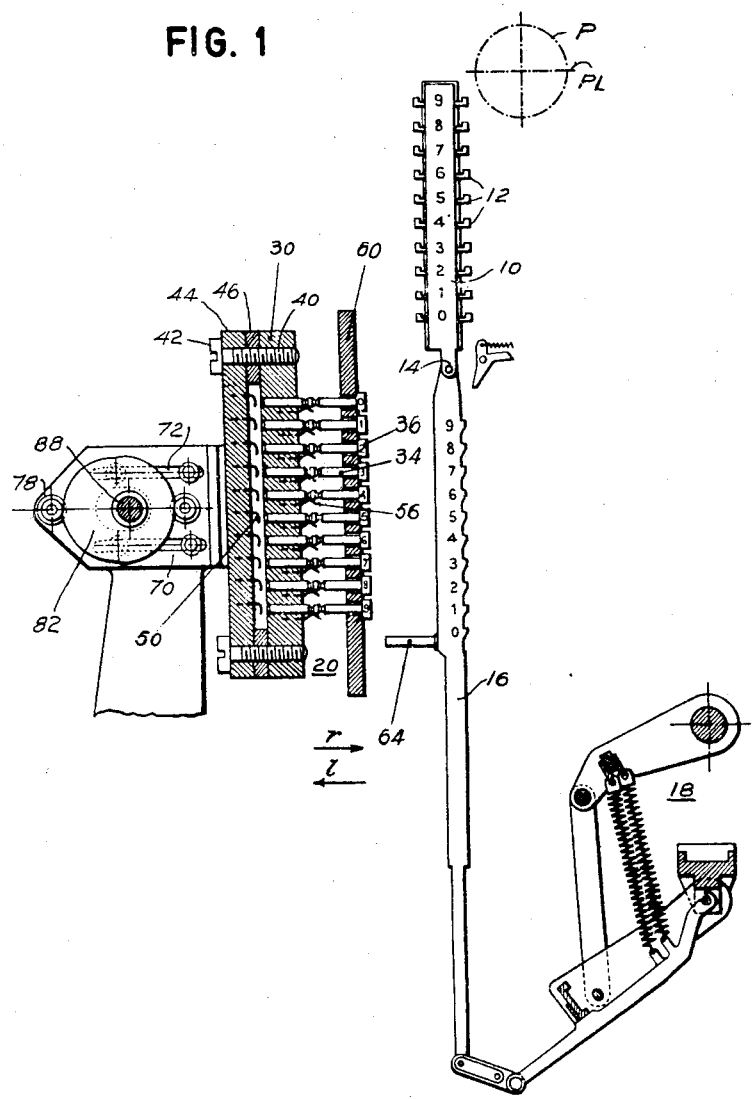
Figs. 1, 2 and 3 are similar schematic views showing the readout device comprising the present invention operatively associated with a type bar construction and showing the former in a plurality of operating positions.
Figure 2:
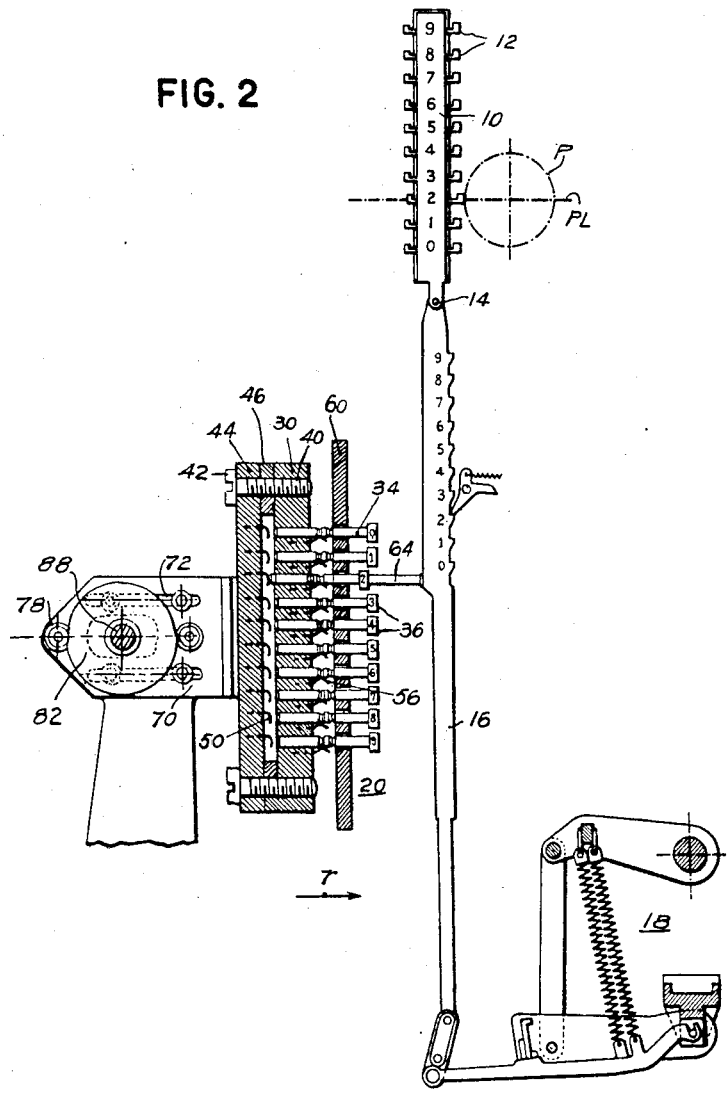
Figure 3:
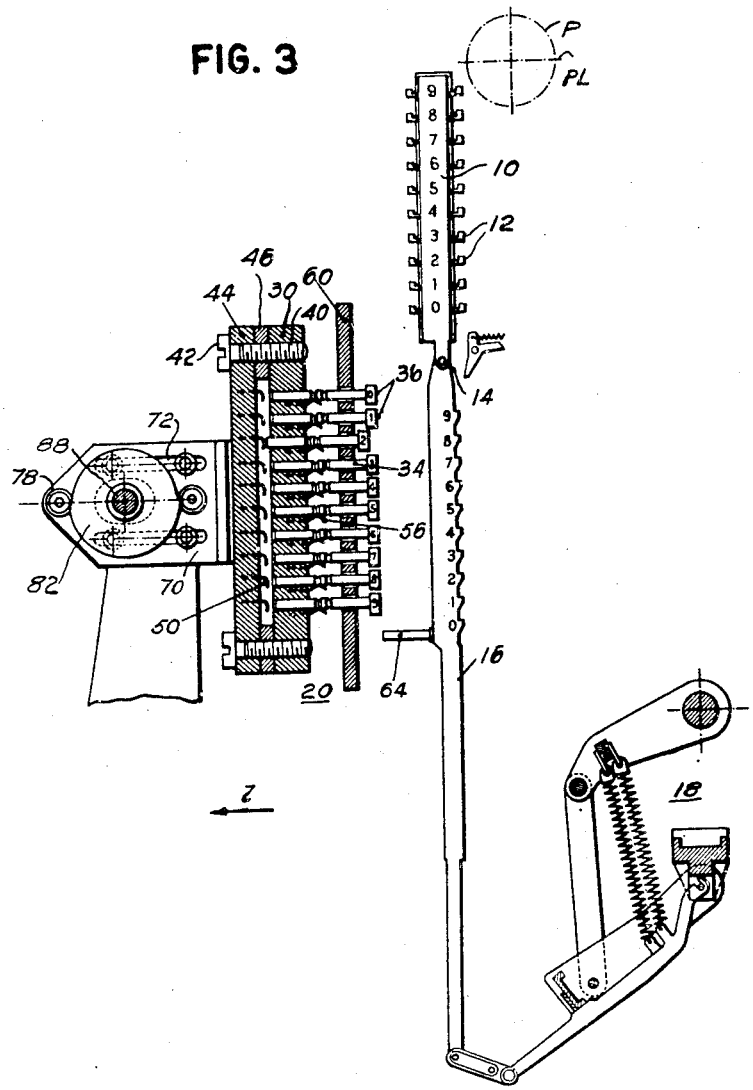

Referring now to the drawings in detail and in particular to Figs. 1, 2 and 3, a type bar is shown at 10 and carries the usual type elements 12. In the disclosure of Figs. 1 to 3 inclusive, the type bar 10 is designed for numerical printing operations only and, as a consequence, the type thereon have been labeled 0 to 9 inclusive. The type bar 10 is pivotally connected at its lower end as at 14 to an operating rod 16, the latter being operatively associated with a conventional type bar actuating mechanism 18. The mechanism 18 is purely conventional in its design and reference may be had to the patent to A. W. Mills, No. 2,016,682, dated October 8, 1935, for Printing mechanism, for a full disclosure thereof.

The control mechanism comprising the present invention is in the form of a readout device designated in its entirety at 20 and which cooperates with the type bar assembly in a manner that will subsequently be made clear to selectively close a plurality of output circuits which may lead to the operating magnets of a perforator or the like and corresponding in number to the number of type elements 12.

Figure 4:
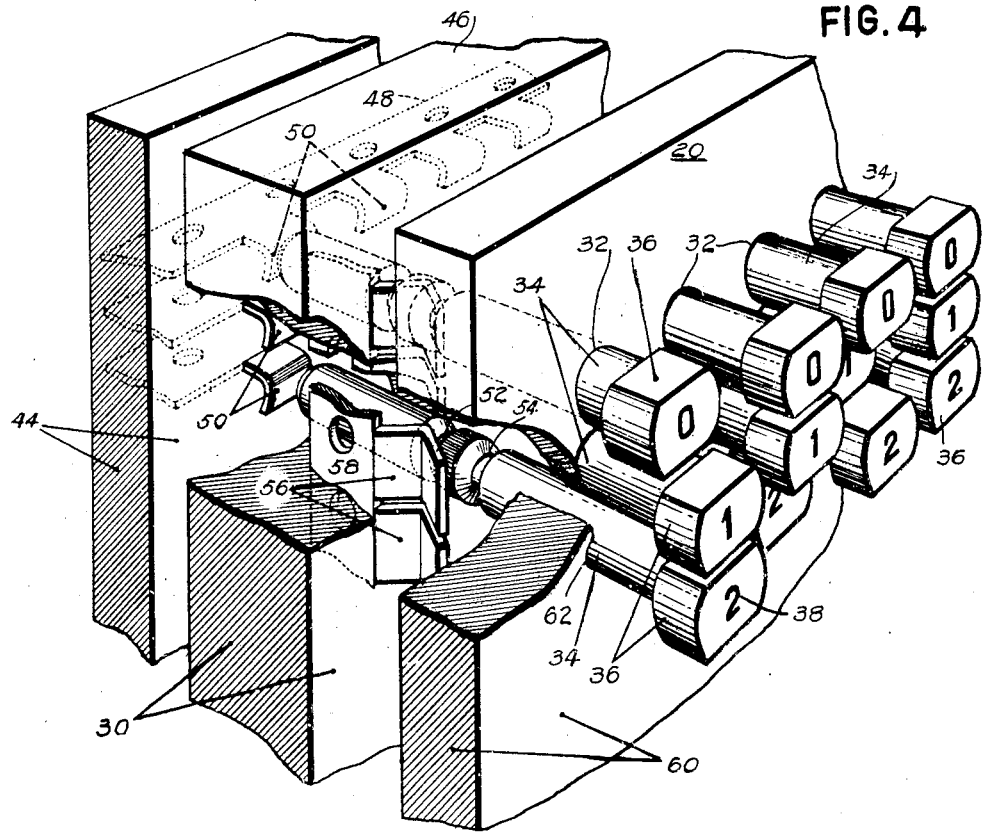
Fig. 4 is a fragmentary perspective view, partly in section, of a plug-carrying plate employed in connection with the present invention.

Referring now additionally to Fig. 4, the readout device 20 involves in its general organization a relatively thick perforated plate 30, preferably moulded and formed of an insulating material and having perforations 32 formed therein. Each perforation 32 has slidably disposed therein a slidable plug or plunger 34 formed of a conducting material. The plungers 34 are equal in number to the overall number of type elements 12 in the various digital orders of the machine. The plungers 34 are each provided with enlarged heads 36 which may, for convenience, carry indicia 38 thereon indicating the relationship which these plungers bear to the type elements of the printing machine.

The plug-carrying plate 30 is provided with a series of threaded apertures 40 in the peripheral regions thereof, each aperture being adapted to receive therein a clamping bolt 42, by means of which a contact-carrying member or plate 44 is clamped in position on the plate 30. Spacer strips 46 serve to maintain the plate 44 spaced from the plate 30, and the two plates and their fastening devices constitute, when assembled, a rigid framework or carriage. The plate 44 carries on its inner face a plurality of contact strips 48 which are embedded in the material of the plate 44 and each of which is provided with a series of forwardly and downwardly extending fingers or contact elements proper 50.

It is to be noted that the contact plungers 34 are arranged in horizontal and vertical alignment, each vertical row of plugs being associated with a corresponding type bar assembly and, in the case of numerical designations, corresponding to the various digital orders of the data to be registered or stored in the readout assembly. The horizontal rows of plungers correspond to the respective denominational values of the types on the bars 10.

Each of the plungers 34 is formed with a pair of annular grooves 52 and 54 respectively and these grooves, which are generally of V-shaped configuration in cross section, are designed for cooperation with a series of electrical detent contact elements 56 integrally formed on a series of vertically extending contact strips 58, which, like the strips 48, are embedded in the material of the plate 30. The arrangement and spacing of the grooves 52 and 54, the length of the plugs 34 and the spacing of the contact elements 50 from the rear surface of the plate 30 are such that when the plungers 34 are moved rearwardly of the assembly to their pushed-in positions, the ends thereof make electrical engagement with their respective contact elements 50. When these plungers are in their extreme forward position the plungers are out of electrical contact with the contact elements 50. In the former instance, in the case of any particular plunger 34, its respective detent 56 will be in position within the groove 54, whereas in the latter position this detent will fall into place within the groove 52. It will be understood, of course, that the detent elements 56 of each of the contact strips 58 are electrically connected together in common and current fed to any one of these detents will be transmitted through its respective plug 34 to its respective contact element 50.

A stationary plate 60 is provided with a series of apertures 62 therethrough, one for each of the plungers 34. The forward regions of the plungers pass through the apertures 62 and the positioning of the plate 60 is such that when the entire frame assembly, including the plates 30 and 44, is moved to the left in the direction of the arrow l, shown in Figs. 1, 2 and 3, to its rearmost position, the heads 36 of the plungers 34 will bear against the forward surface of the plate 60 to restore the plungers to their pushed-out positions.

The operating rods 16, Figs. 1, 2 and 3, are each provided with a plug-operating finger 64 thereon designed for selective cooperation with the heads 36 of the plungers 34. According to the vertical positioning of each type bar 10 with relation to the printing line PL of the platen P, i. e., according to the alphabetical or numerical type which is to perform a particular printing operation, the finger 64 will assume an elevation corresponding to this type for depression of a corresponding plunger 34. Thus, as shown in Fig. 2, during printing of the numeral "2" when the type 12 is in alignment with the printing line PL, the plug-operating finger 64 will be in alignment with one of the plungers 34 corresponding to the numeral "2." Thus, when the assembly is moved to the right, as shown by the arrow r in Fig. 2, this particular plunger will be pushed in so that its respective detent 56 will enter the groove 54 to maintain the plunger 34 in engagement with its respective contact element 50 and also to complete an electrical circuit.

It will be appreciated that in the disclosure of Figs. 1 to 4 inclusive, the type bars 10 are designed for numerical printing only and that in the case of type bars which are designed for alphabetic printing somewhat longer bars will be employed and the additional required number of type elements suitably incorporated therewith. In such an instance, the readout mechanism will include the necessary additional plungers 34, one for each type element. Otherwise, the principles of the invention remain substantially unaltered.

Figure 5:
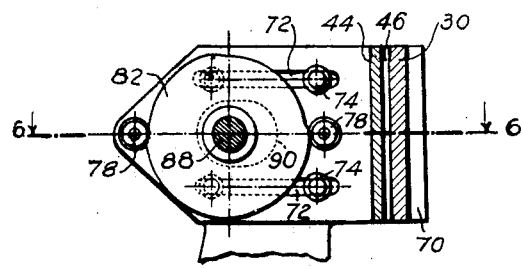
Fig. 5 is a fragmentary enlarged side elevational view, partly in section, of a control device employed in connection with the present invention.
Figure 6:
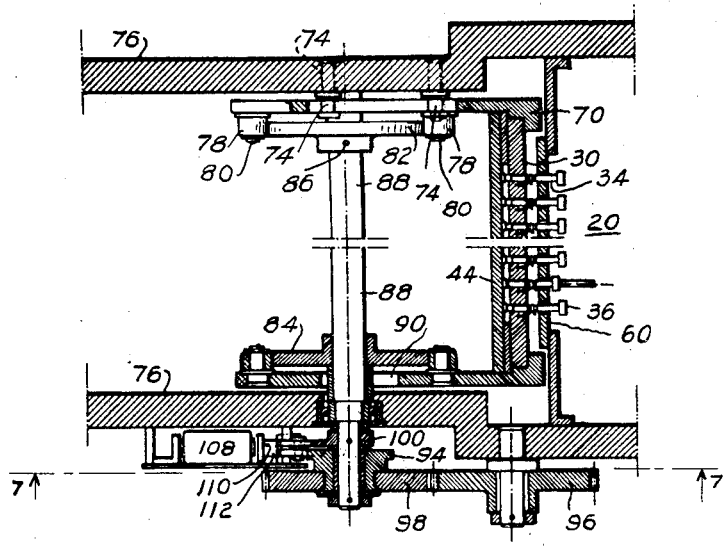
Fig. 6 is a sectional view taken substantially along the line 6—6 of Fig. 5.
Figure 7:
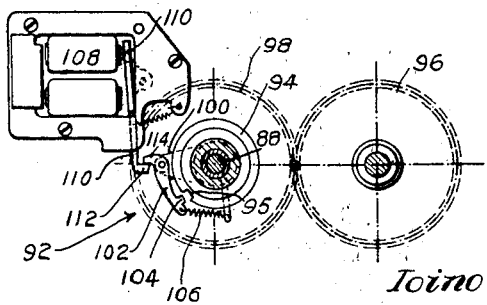
Fig. 7 is a sectional view taken substantially along the line 7—7 of Fig. 6.

The driving mechanism for the plunger-carrying assembly, by means of which the latter is reciprocated at predetermined points in the machine cycle, is best illustrated in Figs. 5, 6 and 7. The readout assembly 20 is disposed between a pair of jaws 70 which are provided with slots or guideways 72 which slidably receive therein studs 74 which are anchored to stationary portions of the accounting machine frame 76. Each jaw carries a pair of rollers 78 mounted on spindles 80, the upper rollers cooperating with a rotary cam 82 and the lower rollers cooperating with a similar cam 84, the cams 82 and 84 being keyed as at 86 to a vertically disposed central shaft 88 which passes through respective central openings 90 formed in the jaws 70. The shaft 88 may be operatively connected to the main drive shaft of the tabulating machine by means of a one-revolution clutch device designated in its entirety at 92 and the nature of which will be set forth presently. The lower end of the shaft 88 has rotatably mounted thereon a ring 94 formed with a groove 95 therein and which is adapted to receive its rotary motion from the main operating shaft of the tabulating machine by means of a pair of sprockets 96 and 98, the latter sprocket being concentric with the grooved ring 94. A lever 100 is keyed to the shaft 88 and has hingedly connected thereto a pawl 102 formed with a tooth 104 thereon adapted to enter the groove 95 formed in the ring 94. A spring 106 normally urges the pawl 102 inwardly of the shaft 88. An electromagnet 108 suitably supported from the framework of the machine is provided with an armature 110, the outer end of which is formed with a latch 112 which cooperates with a finger 114 formed on the pawl 102 to maintain the latter in its disengaged position wherein the tooth 104 thereof is withdrawn from the groove 95 formed in the ring 94. Upon energization of the electromagnet 108 the armature 110 will be retracted, thus releasing the finger 114 and allowing the tooth 104 to ride on the cylindrical surface of the ring 94 until the groove 95 is encountered, after which the pawl will move inwardly, thus locking the parts together and causing the rotation of the shaft 88 under the influence of the driving sprockets 96 and 98. The entire arrangement of the clutch 92 is such that the shaft 88 will be rotated throughout a complete number of cycles as long as the electromagnet 108 remains energized. Upon deenergization of this magnet, any incomplete cycle will be completed, after which the latch 112 will engage the finger 114, thus retracting the pawl 102 and withdrawing the tooth 104 from the groove 95 provided in the ring 94.

The control electromagnet 108, whose energization controls the starting and stopping of the driving operation for the readout assembly, is adapted to be connected by a suitable plug connection in various ways to the plug board of the tabulating machine. For certain classes of operation, it may be connected to the plugs of major, intermediary or minor controls, as for example, those shown in the patent to A. W. Mills, No. 2,079,418, dated May 4, 1937, for a Totaling device, or to the group indicator circuits of this or similar machines (see also the patent to J. R. Peirce, No. 2,199,547, dated May 7, 1940, for a Record perforating device). The magnet 108 may, of course, be energized by a manual operation through any suitable circuit-closing device which becomes effective to close the magnet circuit simultaneously with the initiating of a total-taking operation.

The motion imparted to the readout assembly is an alternating translatory motion, the amplitude of which is regulated by the size and shape of the two cams 82 and 84. Prior to operation of the mechanism, the various parts assume a position wherein the forward surface of the heads 36 of the plungers 34 are slightly spaced from the vertical plane of the rear ends of the plug operating fingers 64. As soon as the tooth 104 of the pawl 102 enters the groove 95 formed in the ring 94, due to energization of the magnet 108 and consequent release of the pawl, the shaft 88 will commence to rotate and the readout assembly will receive an initial movement which will carry it in a direction away from the type bars so as to insure resetting or return of any plungers which have previously been driven in during an earlier printing operation. The plungers 34 assume the position illustrated in Fig. 1 wherein the heads 36 are in engagement with the stationary plate 60. Continued rotation of the shaft 88 causes the entire plunger-carrying assembly to be moved to the right in the direction indicated by the arrow in Fig. 2 until such time as the fingers 64 engage the respective plungers with which they are in register. This will cause the latter plungers to be driven in and their corresponding electrical circuits to be completed. Finally, the assembly is again moved away from the type bars in the direction of the arrow in Fig. 3, thus bringing the assembly to a position of rest wherein the previously driven-in plungers remain in their circuit closing positions.

Referring now to Fig. 8, the readout assembly has been shown as being capable of accommodating a printing mechanism in which the print bars each carry thirty-six type elements, twenty-six of which are for alphabetical designations and the remaining ten for numerical designations. According to the present system, alphabetical characters are represented on Hollerith tabulating cards by two perforations located in different index point positions in a single card column. One of these perforations is commonly referred to as the "digit" perforation and the other as the "zone" perforation. In the accounting machine, the record cards are passed through the usual feeding and analyzing devices so that they pass over an upper set of analyzing brushes and one machine cycle later move in transit past a lower set of analyzing brushes. During movement of the card past the upper analyzing brush analysis is made of the zone perforation. Later in the machine cycle, as the card passes the lower brushes, the digit perforation is analyzed. The separate analyses of both the perforations operate through suitable decoding mechanism to control the positioning of the type bar and the type elements carried thereby to select a single alphabetical character represented by the code arrangement of perforations analyzed.

Whereas the readout device of Figs. 1 to 4 inclusive has been illustrated in connection with the printing by the type bar 10 and the consequent perforation in the summary card of numerical data only, the principles of the invention have been extended in Fig. 8 to include the printing and perforation of alphabetical characters in addition to numerical characters. As a result, each vertical plunger column includes thirty-six plungers 34, each corresponding to one of the thirty-six types of the alphabetical and numerical bar 10 with which it cooperates. Since each letter is represented by two perforations made in a single column of the bookkeeping card, as outlined above, for each alphabetical character registered in the device two distinct impulses must be emitted which, after passing through the device, will actuate the punches of the perforating machine to perforate the alphabetical data on the summary card. Toward this end, an impulse emitter designated in its entirety at 120 is provided with a rotor 122 mounted on a shaft 124 which is synchronized with the main shaft of the tabulating or printing machine. The rotor 122 consists of a dual brush arrangement 123 which cooperates with a series of segments 126, each connected by a lead through a series of three-blade contact assemblies 128 to respective contact fingers or contacts 50 in the series. The detent elements or contacts 56 of each vertical column are electrically connected in parallel to respective operating magnets 130 of the perforating machine. The contact assemblies 128 are each in the form of a multiple device so arranged that the extreme blades of each group of three sub-assemblies is connected to both of the contact segments 126 representing a particular alphabetical designation, while the medial blade of each sub-assembly is connected to the corresponding contact strip 48 carrying the contact fingers or elements 50. The contact groups or assemblies 128 are adapted to be operated in unison, all from a common actuating magnet 132 whose energization is dependent upon the closure of a pair of cam contacts 134 having an operating cam 136 therefor, this cam being synchronized with the movements of the rotor 122 in such a manner that the magnet 132 is maintained energized during the analysis cycle of positions "9" to "1" inclusive and is maintained deenergized during the positions "0," "11" and "12." Thus it will be seen that during positions "1" to "9" inclusive, the medial blades of the contact groups 128 will assume positions opposed to the normal positions shown in Fig. 8 and during positions "0," "11" and "12" these blades will return to their normal positions. Thus, during numerical printing and perforating operations a direct connection will be established between the various contact segments 126 and their respective contact elements 56 through the assemblies 128 in their normal positions. During such numerical printing and perforating operations, the magnet 132 will remain deenergized and thus, in an instance where alphabetical printing and perforating operations are dispensed with entirely, the contact groups or assemblies 128 may likewise be dispensed with.

For illustrative purposes, in order that printing and perforating operations where alphabetical characters are concerned may be made clear, the various plungers 34 have been set up to illustrate a particular operation in connection with the word-group LAC. This word-group has, of course, been registered in the readout device from the type bars 10 of the tabulating machine in a manner previously described so that a transfer may be made by a perforating operation to a summary card. The transfer of the letter L will be described in detail by setting forth the path of current impulses passing from the emitter 120 to the magnet 130 as characterized by a digit perforation "3" and a zone perforation "11."

When the rotor 122 of the emitter 120 traverses the "3" contact segment 126, the pair of contacts 134 will be closed and, as a consequence, the medial blades of the contact groups 128 are reversed and occupy positions opposed to those represented in Fig. 8. As a consequence, a circuit is established from the line 138 through the emitter 120 to the "3" segment thereof and from thence through the reversed contacts of the group 128 associated with the letter L, contact element 50, plungers 34, contact element 56 and common connection 140, punch magnet 130 and return line 142. A punch 131 is shown in Fig. 8 as being operable under the control of the magnet 130. In this manner a first current impulse corresponding to the perforation "3" is sent to the electromagnet 130 at the precise moment when the rotor 122 passes over the "3" contact segment 126. This impulse through the magnet 130 is maintained as long as the contacts 134 remain closed. However, this latter contact 134 becomes opened as the rotor passes between the "1" and the "0" positions, whereupon the medial blades of the contact group 128 return to their normal positions. Thereafter, as the rotor passes over the "11" contact segment, a second current impulse is emitted and passes from the line 138 through the emitter to the "11" contact segment and from thence through the contact groups 128 which now assume their normal positions through the contact element 50, plunger 34, contact element 56, common connection 140, magnet 130 to the return line 142. The two circuits just traced have been indicated in the drawings in heavy lines. The electromagnet 130 is thus energized a second time so that when controlling a punch in the perforating machine the perforations "11" and "3" will be made in the same column of the summary card. These perforations correspond to the letter L.

The numerical or alphabetical capacity of the present readout device may be extended at will and offers a material degree of safety inasmuch as the registration of data to be transferred is effected directly from the type bars, thus assuring perfect coordination with the printing operation.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. A readout device designed for cooperation with a type carrier having an abutment thereon, said readout device including a movable carriage, a plurality of plungers slidably mounted in said carriage and movable from extended to retracted positions and vice versa, each plunger corresponding to one of the type on said carrier and positioned for registry with said abutment when the carrier is in a predetermined printing position, means for moving the carriage from a retracted position wherein said plungers are out of engagement with said abutment to an advanced position wherein one of them is engaged and retracted by said abutment, a shoulder on each plunger, a stationary abutment positioned in the path of said shoulders and operable to engage the latter during movement of said carriage to its retracted position to restore the plungers to their advanced positions, and a plurality of work circuits adapted to be selectively closed upon depression of said plungers.

2. A data storing and readout device of the character described comprising a framework formed of insulating material, a set of contact strips mounted in said framework and electrically insulated from one another, each representing a predetermined denomination, a second set of contact strips likewise mounted in the framework and electrically insulated from each other and from the contact strips of the first set, each of said latter contact strips representing a different order, and a plurality of plungers formed of conducting material slidably disposed in said framework and being arranged in vertical and horizontal rows, each horizontal row representing a denomination and each vertical row representing an order, the plungers of each vertical row being in electrical engagement with a contact strip of the second set and normally occupying positions out of engagement with the contact strips of the first set, the plungers of corresponding denominations being movable into engagement with a corresponding contact strip of the first set.

3. A data storing and readout device of the character described comprising a framework formed of insulating material, a set of contact strips mounted in said framework and electrically insulated from one another, each representing a predetermined denomination, a second set of contact strips likewise mounted in the framework and electrically insulated from each other and from the contact strips of the first set, each of said latter contact strips representing a different order, a plurality of plungers formed of conducting material slidably disposed in said framework and being arranged in vertical and horizontal rows, each horizontal row representing a denomination and each vertical row representing an order, the plungers of each vertical row being in electrical engagement with a contact strip of the second set and normally occupying positions out of engagement with the contact strips of the first set, the plungers of corresponding denominations being movable into engagement with a corresponding contact strip of the first set, there being a pair of depressions formed in each plunger and arranged in spaced relationship, said contact strips of the second set constituting detents designed for cooperation with the depressions of the plungers with which they are in electrical contact to maintain the plungers either out of engagement or in engagement with the contact strips of the first set.

4. In a card controlled machine of the character described for effecting digital and alphabetical card punching operations including the punching of both zone and digit perforations in a record card, a punch operating magnet, a punch operable under the control of said magnet, an emitter including a contact segment for each digit position and for each zone position in the card undergoing punching operations, means for successively energizing the digit contact segments and for thereafter successively energizing the zone contact segments, a circuit for said magnet, a plurality of pairs of contacts each operable upon closing thereof to potentially energize the magnet circuit, each pair of contacts representing a digital or an alphabetical character to be punched in the card undergoing punching, a plurality of two-way contact groups, one for each digit character and one for each alphabetical character to be punched in the card undergoing punching, said contact groups normally being closed in one direction to establish electrical connection between each of said digit contact segments and one contact of each pair of contacts according to the digital components of the various characters represented by said pairs, said contact groups when closed in the other direction serving to normally establish electrical connection between each of said zone segments and the same contact of each pair of contacts according to the zone components of the various characters represented by said pairs, means for shifting all of said contact groups during energization of the zone contact segments, and means for selectively closing said pairs of contacts.

IOINO GHERTMAN.

REFERENCES CITED

The following references are of record in the file of this patent:

UNITED STATES PATENTS

| Number | Name | Date |
| --- | --- | --- |
| 1,834,561 | Watson | Dec. 1, 1931 |
| 1,873,797 | Turner | Aug. 23, 1932 |
| 1,905,228 | James | Apr. 25, 1933 |
| 2,181,999 | Mills | Dec. 5, 1939 |
| 2,272,448 | Von Pein | Feb. 10, 1942 |